(12) United States Patent
Nijhof et al.

(10) Patent No.: US 7,030,572 B2
(45) Date of Patent: Apr. 18, 2006

(54) LIGHTING ARRANGEMENT

(75) Inventors: Engbert Bernard Gerard Nijhof, Eindhoven (NL); Marcel Johannes Maria Bucks, Weert (NL); Johannes Matheus Theodorus Lambertus Claessens, Eindhoven (NL); Jozef Petrus Emanuel De Krijger, Geldrop (NL)

(73) Assignee: Lumileds Lighting U.S., LLC, San Jose, CA (US)

( * ) Notice: Subject to any disclaimer, the term of this patent is extended or adjusted under 35 U.S.C. 154(b) by 108 days.

(21) Appl. No.: 10/726,854

(22) Filed: Dec. 2, 2003

(65) Prior Publication Data

US 2004/0145320 A1    Jul. 29, 2004

(30) Foreign Application Priority Data

Dec. 3, 2002    (EP)    .................................. 02080063

(51) Int. Cl.
*H05B 37/00*    (2006.01)
(52) U.S. Cl. ...................................... 315/291; 315/219

(58) Field of Classification Search ................ 315/219, 315/225, 224, 307, 291, 86, 209 R, 200 A, 315/244, 247
See application file for complete search history.

(56) References Cited

U.S. PATENT DOCUMENTS

| 5,517,397 | A | | 5/1996 | Quek et al. .................... 363/21 |
| 5,719,474 | A | | 2/1998 | Vitello ......................... 315/307 |
| 5,739,639 | A | * | 4/1998 | Johnson ........................ 315/86 |
| 6,320,330 | B1 | * | 11/2001 | Haavisto et al. ............. 315/291 |
| 6,667,583 | B1 | * | 12/2003 | Kerenyi ....................... 315/219 |

FOREIGN PATENT DOCUMENTS

| EP | 0 372 181 A | 6/1990 |
| EP | 0 905 972 A | 3/1999 |
| WO | WO 01/05193 A1 | 1/2001 |

* cited by examiner

*Primary Examiner*—Wilson Lee
(74) *Attorney, Agent, or Firm*—Patent Law Group LLP

(57) ABSTRACT

In a lighting arrangement comprising a LED array and a DC-DC-converter for supplying the LED array, the DC-DC-converter is an up-converter and the LED array is coupled between an input terminal and an output terminal. The up-converter generates a very low voltage over the LED array without making use of a transformer.

7 Claims, 1 Drawing Sheet

LIGHTING ARRANGEMENT

BACKGROUND

1. Field of Invention

The invention relates to a lighting arrangement comprising a LED array and a circuit arrangement for supplying the LED array.

2. Description of Related Art

A lighting arrangement as mentioned in the opening paragraph is known from WO 01/05193. The known lighting arrangement is used for instance as a backlight in a Liquid Crystal Display. The DC-DC-converter that is used is of the flyback type. Since the voltage that is present over the LED array is comparatively low, the DC-DC-converter generally needs to comprise a transformer. A disadvantage of such a transformer is that it is an expensive and bulky component.

It is an object of the invention to provide a lighting arrangement in which the disadvantage described above is absent.

SUMMARY

According to embodiments of the present invention, a lighting arrangement includes an LED array coupled between an input terminal and an output terminal.

Since it is possible to control the difference between the DC input voltage $V_{in}$ and the DC output voltage $V_{out}$ at a comparatively low value, it is possible to operate a LED array in a lighting arrangement according to the invention without making use of a transformer. As a result, the lighting arrangement is comparatively cheap and small.

Good results have been obtained for embodiments of a lighting arrangement according to the invention, wherein the control circuit is equipped with means for operating the DC-DC-converter in the critical discontinuous mode. In the critical discontinuous mode the switching element is only rendered conductive when the current in the inductive element has become substantially zero. As a result power losses in the diode are comparatively low.

Good results have also been obtained for embodiments of a lighting arrangement according to the invention, wherein the DC-DC-converter is an up-converter. Also the up-converter is preferably operated in the critical discontinuous mode. An important advantage of the use of an up-converter with respect to the use of most other DC-DC-converters is that the up-converter draws a substantially continuous current from the supply voltage source. In case of most other DC-DC-converters operating in the critical discontinuous mode a current is only drawn from the supply voltage source during part of each period of the control signal. As a result these latter DC-DC-converters have to be designed for higher peak currents than an up-converter for the same average current through the LED array.

Preferably, a capacitor is coupled between the output terminals. Such a capacitor stabilizes the voltage between the output terminals and thereby also the voltage over the LED array.

A preferred embodiment of a lighting arrangement according to the invention is characterized in that the DC-DC-converter is equipped with means I for controlling the current through the LED array at a predetermined value. By controlling the average current through the LED array, the average light output of the LED array is also controlled. A controlled light output is often desirable, for instance in case the lighting arrangement is used as a backlight. The means I preferably comprise means coupled to the input terminals and the output terminals for controlling a time lapse $T_{on}$, during which the switching element is maintained in a conductive state during each period of the control signal, proportional to a mathematical expression that is a function of $V_{in}$ and $V_{out}$. In case the DC-DC-converter is an up-converter, the means I comprise means for controlling $T_{on}$ proportional to $V_{out}/V_{in}^2$. It has been found that the means I can be implemented in a comparatively simple way and that the means I provide a fast control of the LED array current. More information with respect to a possible implementation of such means I can be found in copending patent application Ser. No. 10/614,878, filed Jul. 7, 2003, titled "Circuit Arrangement" and incorporated herein by this reference.

A further preferred embodiment of a lighting arrangement according to the invention is characterized in that the DC-DC-converter is equipped with means II for substantially square wave modulating the amplitude of the current through the LED array. By adjusting the duty cycle of the substantially square wave modulation, the average current through the LED array can be adjusted and thereby the light output of the LED array can be controlled. In practice the modulation depth is often chosen as 100% so that the LED array does not carry any current during part of each period of the modulation. When in the remaining part of each period of the modulation the LED array does carry a current, it is desirable that this current increases comparatively fast to its stationary value. Such a comparatively fast increase is realized by the implementation of the means I described above.

BRIEF DESCRIPTION OF THE DRAWINGS

An embodiment of a lighting arrangement according to the invention will be described making reference to the following drawings. In the drawings.

DETAILED DESCRIPTION

Figure 1:
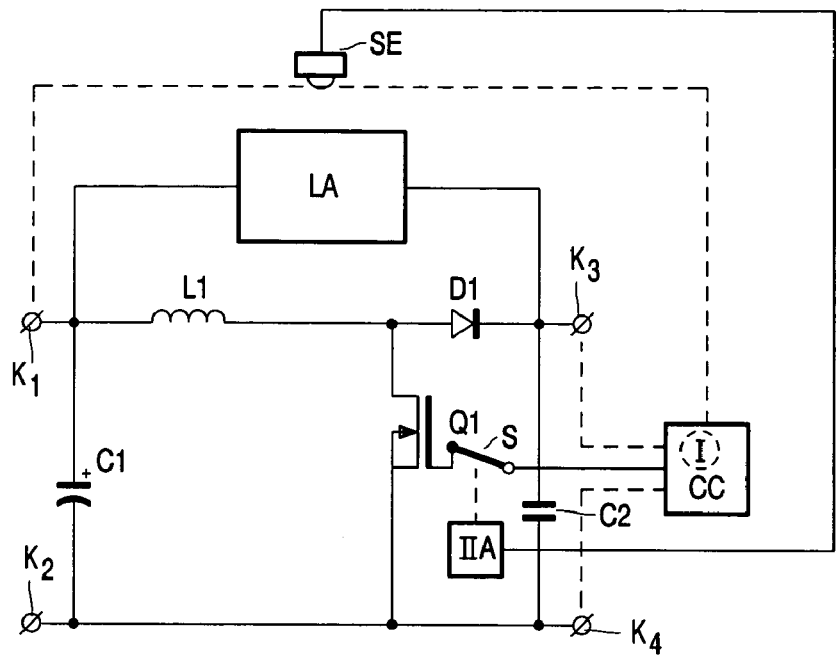
FIG. 1 shows a schematic diagram of an embodiment of a lighting arrangement according to the present invention.

In FIG. 1, K1 and K2 are first and second input terminals respectively for connection to a supply voltage source supplying a DC input voltage $V_{in}$. Input terminal K1 and input terminal K2 are connected by means of a capacitor C1 and by means of a series arrangement of an inductive element L1 and a switching element Q1. A control electrode of switching element Q1 is connected to an output of circuit part CC via a switching element S. Circuit part CC is a control circuit for generating a control signal for rendering the switching element Q1 periodically alternately conductive and non-conductive. Circuit part CC comprises means I, coupled to the input terminals and the output terminals (indicated by means of dotted lines), for controlling a time lapse $T_{on}$, during which the switching element is maintained in a conductive state during each period of the control signal, proportional to $V_{out}/V_{in}^2$. Switching element Q1 is shunted by a series arrangement of diode D1 and capacitor C2. A common terminal of diode D1 and capacitor C2 forms a first output terminal K3. A second output terminal K4 is formed by a common terminal of capacitor C1 and capacitor C2. The series arrangement of inductive element L1 and diode D1 is shunted by a LED array LA, that is thus coupled between input terminal K1 and output terminal K3. An output terminal of circuit part IIa is coupled to switching element S. An input terminal of circuit part IIa is coupled to a light sensor SE placed in the vicinity of the LED array LA. The sensor SE, circuit part IIa and switching element S together form means II for substantially square wave modulating the amplitude of the current through the LED array.

Input terminals K1 and K2, output terminals K3 and K4, capacitors C1 and C2, inductive element L1, switching element Q1, diode D1 and circuit part CC together form a DC-DC-converter that is an up-converter. The up-converter together with the LED array LA forms a lighting arrangement.

The operation of the lighting arrangement shown in FIG. 1 is as follows.

When the input terminals K1 and K2 are connected to a supply voltage source that supplies a first DC voltage $V_{in}$, the circuit part CC generates a control signal that periodically alternately renders the switching element Q1 conductive and non-conductive. When switching element Q1 is conductive a DC current with linearly increasing amplitude flows through the inductive element L1 and switching element Q1. When the switching element is subsequently rendered non-conductive, the amplitude of the current decreases linearly and a current flows through inductive element L1 and diode D1 and charges capacitor C2. The up-converter is operated in the critical discontinuous mode: when the current through the inductor has become equal to zero, the control signal renders the switching element Q1 conductive again and the cycle described hereabove is repeated. As a result of this operation a DC output voltage $V_{out}$ is present between output terminals K3 and K4 and across capacitor C2. A voltage equaling $V_{out}$-$V_{in}$ is present over the LED array LA and a DC current flows through the LED array from output terminal K3 to input terminal K1. It has been found that in practice the DC output voltage $V_{out}$ can be controlled at a value that is only 4 Volts higher than the DC input voltage $V_{in}$. Accordingly it is possible to have a voltage drop over the LED array as small as 4 Volt without making use of a transformer. Alternatively the DC output voltage $V_{out}$ of the up-converter can also be controlled at a value that is much higher than the input voltage. In practice it has been found that the DC-output voltage can be controlled at a value that equals $3*V_{in}$. In this latter case the voltage across the LED array equals $2*V_{in}$. As a consequence, in the lighting arrangement shown in FIG. 1, the voltage across the LED array can be adjusted at many different values so that the circuit arrangement is compatible with many different LED arrays. The embodiment shown in FIG. 1 comprises means I for controlling the current through the LED array. The means I are comprised in the control circuit CC and coupled to the input terminals and the output terminals and renders the time lapse $T_{on}$, during which the switching element Q1 is maintained in a conductive state during each period of the control signal, proportional to $V_{out}/V_{in}^2$. It has been found that the average value of the current charging capacitor C2 is controlled at a constant value during time intervals in which the switching element S is conductive. Thereby the current through the LED array is also controlled at a constant value during time intervals in which the switching element S is conductive. The circuit arrangement is further equipped with means II for substantially square wave modulating the amplitude of the current through the LED array. This modulation is easily effected by periodically interrupting the connection between the control circuit CC and the switching element Q1 during a predetermined time lapse by making the switching element S non-conductive. During such an interruption the switching element Q1 is not rendered conductive so that no current is drawn from the supply voltage source through Q1. As a consequence the DC output voltage quickly drops to a value that approximately equals the DC input voltage $V_{in}$ and the LED array LA does no longer carry a current. When the connection of the control circuit CC and the control electrode of switching element Q1 is restored because the circuit part IIa renders the switching element S conductive again, the DC output voltage rises quickly to its stationary value and the LED array LA carries a current. It has been found that the means I, by rendering the time lapse $T_{on}$, proportional to $V_{out}/V_{in}^2$, make the DC output voltage rise quickly so that the same is true for the current through the LED array. Such a quick response is very desirable when the light output is adjusted by the means II. The sensor SE generates a signal that represents the average light output of the LED array. Circuit part IIa controls the duty cycle of the substantially square wave modulation of the amplitude of the current through the LED array in such a way that the average light output of the LED array has a desired value. This desired value can be a constant value, but in many applications is a signal that is a function of time.

Figure 2:
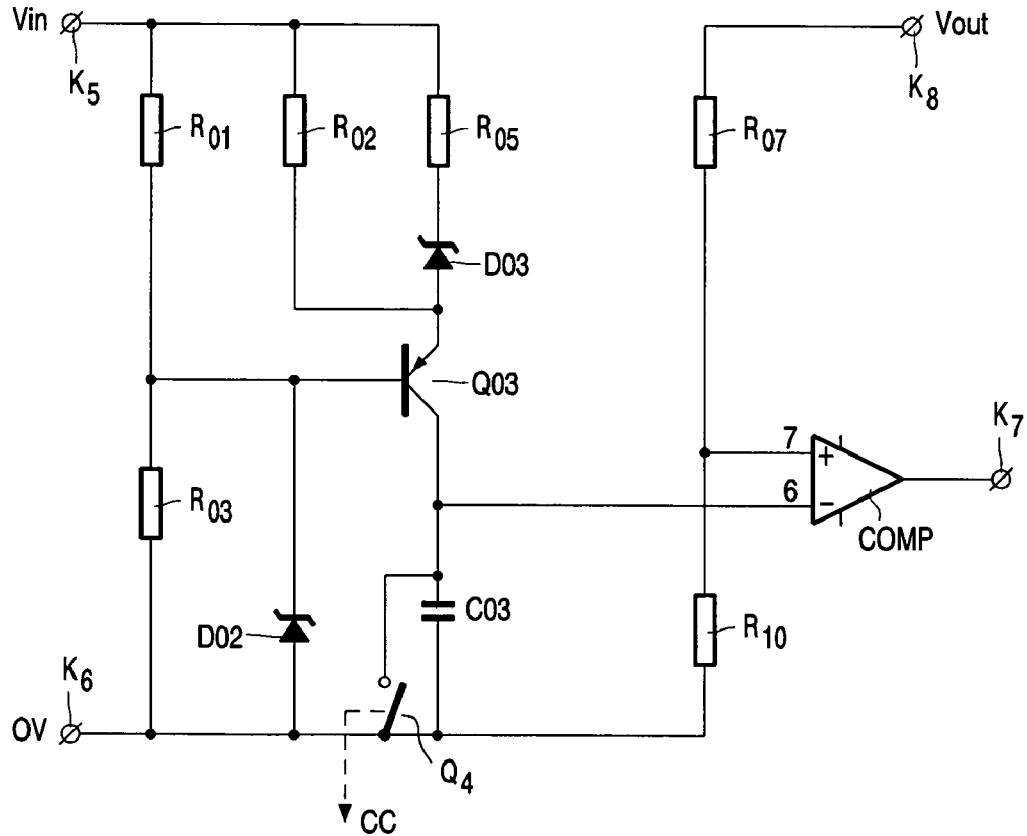
FIG. 2 shows a part of the circuitry of the lighting arrangement shown in FIG. 1 in more detail.

FIG. 2 shows the means I comprised in circuit part CC in the embodiment shown in FIG. 1 in more detail. In FIG. 2, K5 is a terminal that is connected to input terminal K1 and K6 is a terminal that is connected to input terminal K2, so that during operation the voltage $V_{in}$ is present between terminals K5 and K6. Terminals K5 and K6 are connected by means of a series arrangement of ohmic resistors R1 and R3 and by means of a series arrangement of ohmic resistor R5, zener diode D3, transistor Q3 and capacitor C3. Ohmic resistor R3 is shunted by zener diode D2. A common terminal of ohmic resistor R3 and zener diode D2 is connected to a basis electrode of transistor Q3. Terminal K5 is connected to an emitter electrode of transistor Q3 by means of ohmic resistor R2. Capacitor C3 is shunted by a switching element Q4. A control electrode of switching element Q4 is connected to the output terminal of circuit part CC. Ohmic resistors R1, R2, R3 and R5, zener diodes D2 and D3 and transistor Q3 are so dimensioned that together they form a current source that is dimensioned to supply a current that is proportional to $V_{in}^2$. Terminal K8 is connected to output terminal K3. Terminal K8 is also connected to terminal K6 by means of a series arrangement of ohmic resistors R7 and R10. During operation the voltage $V_{out}$ is present across this series arrangement. A common terminal of ohmic resistor R7 and ohmic resistor R10 is connected to a first input terminal of comparator COMP. A common terminal of transistor Q3 and capacitor C3 is connected to a second input terminal of comparator COMP. K7 is a comparator output terminal that is coupled to the control electrode of switching element Q1.

The operation of the means I shown in FIG. 2 is as follows.

When the circuit part CC detects that the switching element Q1 needs to become conductive, the voltage at its output terminal changes from low to high and switching element Q4 is rendered conductive so that capacitor C3 is discharged. As a result the voltage present at the second input terminal of the comparator COMP becomes lower than the voltage present at the first input terminal of the comparator, so that the voltage present at the comparator output terminal K7 becomes high and switching element Q1 is rendered conductive. As soon as capacitor C3 is discharged switching element Q4 is rendered non-conductive again and the current source supplying a current that is proportional to $V_{in}^2$ charges capacitor C3. As long as the voltage over capacitor C3 is lower than the voltage at the first input terminal of the comparator COMP, the voltage at the comparator output terminal is high and switching element Q1 is maintained in a conductive state. The voltage at the output comparator terminal becomes low and therefore the switching element Q1 becomes non-conductive, when the voltage across capacitor C3 becomes equal to the voltage at the first input terminal of the comparator COMP. Since the current charging capacitor C3 is proportional to $V_{in}^2$ and the voltage at the first input terminal is proportional to $V_{out}$, it follows that $T_{on}$ is proportional to $V_{out}/V_{in}^2$. The current source is designed in such a way that is suitable for use with two different values of $V_{in}$, such as 12 V and 24 V. At the lowest value of the two different values of $V_{in}$, only zener diode D2 and not zener diode D3 is conductive. As a consequence the current supplied by the current source is the current through ohmic resistor R2. At the highest of the two different values of $V_{in}$, both zener diodes are conducting and the current supplied by the current source is the sum of the currents through ohmic resistors R2 and R5.

It is noteworthy to observe that the current source in FIG. 2 is so designed that the current it supplies is proportional to $V_{in}^2$ only to a good approximation and not exactly. Furthermore, $V_{in}$ is often supplied by a battery and therefore will only vary over a limited range. As a consequence it is only necessary for the current source to supply a current that is approximately proportional to $V_{in}^2$, for values of $V_{in}$ that differ not too much (for instance only 10% or 20% at most) from the average value of $V_{in}$. In case for instance the current source is designed for an average value of $V_{in}$ that equals 12 V, it is in most practical cases completely satisfactory when the current source supplies a current that is approximately proportional to $V_{in}^2$ for values of $V_{in}$ within the range $10.8V<V_{in}<13.2V$. Similarly, in case the current source is designed for two different average values of $V_{in}$ such as 12V and 24 V, satisfactory results are obtained when the current source only supplies a current that is approximately proportional to $V_{in}^2$, for values of $V_{in}$ for instance within the range $10.8V<V_{in}<13.2V$ and for values of $V_{in}$ for instance within the range $21.6V<V_{in}<26.4V$.

In a practical embodiment of the circuitry shown in FIG. 1 and FIG. 2 it was found that a variation by 10% of $V_{in}$ caused the output current $I_{out}$ to change by less than 3%. Similarly a variation by 20% of $V_1$, caused the output current $I_{out}$ to change by less than 5%. In case the means I would be absent, or in other words in case the $T_{on}$ of switching element Q1 would remain unchanged, a 10% variation in the input voltage $V_{in}$, would lead to a 20% change in the output current, while a 20% variation in the input voltage $V_{in}$ would lead to a 40% change in the output current $I_{out}$.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is being claimed is:

1. A lighting arrangement comprising a LED array and a circuit arrangement for supplying the LED array, the circuit arrangement comprising a DC-DC-converter for generating a DC output voltage $V_{out}$ out of a DC input voltage $V_{in}$ and equipped with input terminals for connection to a supply voltage source supplying the DC input voltage $V_{in}$;

an inductive element;

a diode;

a switching element for controlling the current through the inductive element;

a control circuit coupled to a control electrode of the switching element for generating a control signal for rendering the switching element periodically alternately conductive and non-conductive; and output terminals between which the DC output voltage $V_{out}$ is present during operation wherein a capacitor is coupled between the output terminals;

wherein the LED array is coupled between an input terminal and an output terminal.

2. A lighting arrangement as claimed in claim 1, wherein the DC-DC-converter is an up-converter.

3. A lighting arrangement comprising a LED array and a circuit arrangement for supplying the LED array, the circuit arrangement comprising a DC-DC-converter for generating a DC output voltage $V_{out}$ out of a DC input voltage $V_{in}$ and equipped with input terminals for connection to a supply voltage source supplying the DC input voltage $V_{in}$;

an inductive element;

a diode;

a switching element for controlling the current through the inductive element;

a control circuit coupled to a control electrode of the switching element for generating a control signal for rendering the switching element periodically alternately conductive and non-conductive; and output terminals between which the DC output voltage $V_{out}$ is present during operation;

wherein the LED array is coupled between an input terminal and an output terminal;

wherein the control circuit is equipped with means for operating the DC-DC-converter in the critical discontinuous mode.

4. A lighting arrangement comprising a LED array and a circuit arrangement for supplying the LED array, the circuit arrangement comprising a DC-DC-converter for generating a DC output voltage $V_{out}$ out of a DC input voltage $V_{in}$ and equipped with input terminals for connection to a supply voltage source supplying the DC input voltage $V_{in}$;

an inductive element;

a diode;

a switching element for controlling the current through the inductive element;

a control circuit coupled to a control electrode of the switching element for generating a control signal for rendering the switching element periodically alternately conductive and non-conductive; and output terminals between which the DC output voltage $V_{out}$ is present during operation;

wherein the LED array is coupled between an input terminal and an output terminal;

wherein the DC-DC-converter is equipped with means I for controlling the average current through the LED array at a predetermined value.

5. A lighting arrangement as claimed in claim 4, wherein the means I comprise means coupled to the input terminals and the output terminals for controlling a time lapse $T_{on}$, during which the switching element is maintained in a conductive state during each period of the control signal, proportional to a mathematical expression that is a function of $V_{in}$ and $V_{out}$.

6. A lighting arrangement as claimed in claim 5, wherein the means I comprise means for controlling $T_{on}$ proportional to $V_{out}/V_{in}^2$.

7. A circuit arrangement as claimed in claim 5, wherein the DC-DC-converter is equipped with means II for substantially square wave modulating the amplitude of the current through the LED array.

\* \* \* \* \*